United States Patent
Karem et al.

(10) Patent No.: US 12,491,985 B2
(45) Date of Patent: Dec. 9, 2025

(54) SLOTTED WING FLAPS FOR A VTOL AIRCRAFT

(71) Applicant: Karem Aircraft, Inc., Lake Forest, CA (US)

(72) Inventors: Abe Karem, N. Tustin, CA (US); John Paul Parcell, Irvine, CA (US)

(73) Assignee: Overair, Inc., Santa Ana, CA (US)

( * ) Notice: Subject to any disclaimer, the term of this patent is extended or adjusted under 35 U.S.C. 154(b) by 348 days.

(21) Appl. No.: 16/677,133

(22) Filed: Nov. 7, 2019

(65) Prior Publication Data
US 2020/0239127 A1 Jul. 30, 2020

Related U.S. Application Data

(60) Provisional application No. 62/757,680, filed on Nov. 8, 2018.

(51) Int. Cl.
B64C 9/18 (2006.01)
B64C 9/20 (2006.01)
B64C 29/00 (2006.01)

(52) U.S. Cl.
CPC ............... B64C 9/18 (2013.01); B64C 9/20 (2013.01); B64C 29/0033 (2013.01)

(58) Field of Classification Search
CPC .......... B64C 9/18; B64C 29/0033; B64C 9/20
See application file for complete search history.

(56) References Cited

U.S. PATENT DOCUMENTS

| | | | | |
|---|---|---|---|---|
| 2,908,454 A | * | 10/1959 | De Wolff | B64C 9/16 244/216 |
| 3,129,907 A | * | 4/1964 | Dornier | B64C 23/005 244/216 |
| 3,478,988 A | * | 11/1969 | Roed | B64C 9/22 244/102 R |
| 3,614,028 A | * | 10/1971 | Kleckner | B64C 9/20 244/54 |
| 3,767,140 A | * | 10/1973 | Johnson | B64C 9/20 244/216 |
| 3,920,203 A | * | 11/1975 | Moorehead | F02K 1/70 244/81 |

(Continued)

FOREIGN PATENT DOCUMENTS

| | | | | |
|---|---|---|---|---|
| FR | 1546878 A | * | 11/1968 | .......... B64C 25/423 |
| WO | 1991005699 | | 5/1991 | |
| WO | 2013140008 | | 9/2013 | |

OTHER PUBLICATIONS

Wikipedia, Flap (aeronautics), 2017, Wikipedia, https://en.wikipedia.org/wiki/Flap_(aeronautics)#Fowler_flap (Year: 2017).*

(Continued)

*Primary Examiner* — William L Gmoser
(74) *Attorney, Agent, or Firm* — Fish IP Law, LLP

(57) ABSTRACT

Devices and systems of the inventive concept provide an aircraft flap system is deflected to achieve minimum drag in cruise, maximum coefficient of lift (CL) at low speed, and minimum download in hover. It does so by opening a gap or slot between an aircraft's wing body and an associated trailing flap during hover flight, while providing a continuous aerodynamic contour under other conditions.

9 Claims, 10 Drawing Sheets

(56) References Cited

U.S. PATENT DOCUMENTS

| | | | | |
|---|---|---|---|---|
| 3,921,942 A * | 11/1975 | Bracka | | B64C 21/025 244/87 |
| 3,971,534 A * | 7/1976 | Grotz | | B64C 9/20 239/265.33 |
| 3,977,630 A * | 8/1976 | Lewis | | B64C 9/16 244/216 |
| 3,987,983 A * | 10/1976 | Cole | | B64C 9/20 244/219 |
| 4,120,470 A * | 10/1978 | Whitener | | B64C 9/323 244/215 |
| 4,301,980 A | 11/1981 | Bradfield et al. | | |
| 4,353,517 A * | 10/1982 | Rudolph | | B64C 9/20 244/216 |
| 4,358,074 A | 11/1982 | Schoen et al. | | |
| 4,702,442 A * | 10/1987 | Weiland | | B64C 9/16 244/218 |
| 4,784,355 A * | 11/1988 | Brine | | B64C 9/16 244/216 |
| 4,796,840 A * | 1/1989 | Heynatz | | B64C 9/16 244/215 |
| 5,096,140 A * | 3/1992 | Dornier, Jr. | | B64C 29/0033 244/12.4 |
| 5,167,383 A * | 12/1992 | Nozaki | | B64C 9/20 D12/337 |
| 5,788,190 A * | 8/1998 | Siers | | B64C 9/20 244/215 |
| 8,534,612 B2 * | 9/2013 | Morris | | B64C 9/26 244/211 |
| 2006/0157614 A1 | 7/2006 | Simpson | | |
| 2013/0026302 A1 | 1/2013 | Lee et al. | | |
| 2014/0061392 A1 | 3/2014 | Karem | | |
| 2019/0002076 A1 * | 1/2019 | Markley | | B64C 5/02 |

OTHER PUBLICATIONS

FR 1546878 Translation (Year: 1968).*
International Search Report and Written Opinion in corresponding International Application No. PCT/US2019/060304 dated Apr. 9, 2020, 9 pages.

* cited by examiner

Stowed position

High lift position

Hover position

SLOTTED WING FLAPS FOR A VTOL AIRCRAFT

This application claims the benefit of U.S. Provisional Application No. 62/757,680 filed on Nov. 8, 2018. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

This invention relates to a flap system on a VTOL aircraft wing.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Winged VTOL aircraft typically use a combination of non-rotating wings and rotating wings (known as rotors) to produce lift sufficient to keep the aircraft airborne at varying flight speeds.

A winged VTOL aircraft has 3 distinct flight regimes corresponding to the source of lift: Hover (rotors only), transition (combination), and cruise (wings only).

The maximum load in hover flight of a winged VTOL aircraft, especially a typical tiltrotor configuration, is limited by the interaction of the rotor-induced flow and the wing. This detrimental interaction is called download and is dependent on the area of the wing positioned in the rotor downwash. A large section of the wing below the rotor is typically deflected downward to reduce the projected area in the downwash of the rotor.

Transition/conversion flight is limited by rotor and wing maximum loading. The maximum wing loading is a product of wing area and wing lift coefficient. Increases in wing area result in penalties both in cruise and hover flight regimes. Therefore, achieving higher lift coefficients is beneficial to maximizing the utility of a winged VTOL aircraft.

Achieving low drag in cruise flight is beneficial to extending range and maximum speed. Flaps designed for low drag minimize the exposed wetted area and reduce sharp features which produce areas of flow separation.

Existing tiltrotors such as the Bell V-22 shown in FIG. 1 and Agusta Westland AW-609 shown in FIG. 3 use single-slotted wing flaperons to provide roll control and low drag in cruise, a lift coefficient increment in transition, and download reduction in hover (patent WO1991005699A1, FIG. 2). The V-22 flap system as described in patent WO1991005699A1 features a single flap element with an adjustable slot gap designed specifically to close the slot at maximum deflection for hover flight. Closure of this slot forces all of the rotor downwash flow to travel around one side of the main element and flap element.

Another proposed download reduction mechanism is the European Clean Sky 2 High Speed Rotorcraft concept shown in FIG. 4. The wing section below the rotor tilts to reduce download.

While not VTOL aircraft, the Douglas A26 and Airbus A400M have similar design objectives of low cruise drag and high wing lift coefficient for takeoff and landing. Both feature a three element wing design with an intermediate body positioned between the main wing body and a trailing flap. This intermediate element rotates with the trailing flap element to expose two slots. By having an additional slot the boundary layer flow which grows on each element can be turned more aggressively than some other designs. This allows larger flap deflections and thereby enables higher lift coefficients. This is apparent in FIG. 6, which provides a drawing of the A26 flap system and its flow characteristics. Deflections up to 40-50 degrees are the typical limit as further deflection would incur a wing stall and reversal of the lift increment.

The A400M wing also features moveable spoiler elements which perform dual functions of adjusting the flap to main element gap and reducing the lift to drag ratio of the wing. To reduce complexity and weight, the A400M flap configuration shown in FIG. 5 features a single simple hinge with the trailing flap and intermediate body moving in unison. The trailing flap and intermediate body must retract into the wing body following the arc resulting from the hinge location. This kinematic relationship constrains the achievable maximum lift coefficient and minimum cruise drag.

Thus, a need still exists for a device that achieves the additional lift increment from a double-slotted flap while achieving both low drag in cruise and low download in hover. Additionally, minimal complexity and weight are advantageous to the VTOL configuration which is more sensitive to weight than typical fixed wing aircraft.

SUMMARY OF THE INVENTION

Devices, systems, and methods of the inventive concept provide a wing with a slotted wing flap that provides a VTOL aircraft so equipped with low drag when in cruise or horizontal flight, and low download when hovering.

One embodiment of the inventive concept is an aircraft wing that includes a wing body with a leading edge and a trailing edge, where the trailing edge has a channel; a trailing flap; and an intermediate body positioned between the wing body and the trailing flap. The intermediate body is positioned within the channel when the aircraft trailing flap is in a stowed position, and a gap is present between the wing body and the intermediate body when the aircraft wing is in a hover position. The gap is dimensioned and/or sized to provide a break in the aerodynamic contour represented by the wing body and the trailing flap when the aircraft wing is in a hover position. The wing body, the intermediate body, and the trailing edge provide a continuous aerodynamic contour when the aircraft wing is in a zero deflection position. The wing body and the trailing edge describe an angle of 35° to 45° when the aircraft wing is in a high lift position, and an angle of 75° to 95° when the aircraft wing is in the hover position. Such an aircraft wing is highly suitable for use with a a tilt rotor aircraft.

Another embodiment of the inventive concept is a method of operating an aircraft (such as a tilt rotor aircraft) by providing the aircraft with a wing that includes a wing body, a trailing flap, and an intermediate body positioned between the wing body and the trailing flap; transitioning the trailing flap between a high lift position with a high lift angle and a hover position with a hover position angle. The high lift angle is defined by the wing body, intermediate body, and the trailing flap and is 35° to 45°. The hover position angle is defined by the wing body, intermediate body, and the trailing flap and is 75° to 95°. A gap is positioned between the wing body and the intermediate body when the aircraft wing is in the hover position, and is sized or dimensioned to provide a break in the aerodynamic contour provided by the wing body and the trailing flap when the wing is in the hover position. Some embodiments include a step of transitioning the wing between the high lift position and a stowed position with a stowed angle, where the stowed angle is defined by the wing body, intermediate body, and trailing flap and is less than 10°. The wing body can include a leading edge and a trailing edge, where the trailing edge has a channel and at least a portion of the intermediate body lies within the channel when the wing is in the stowed position. The wing body, the intermediate body, and the trailing edge provide a continuous aerodynamic contour when the wing is in the high lift position.

BRIEF DESCRIPTION OF THE DRAWINGS

FIG. 1 depicts a prior art aircraft.
FIG. 2 depicts a prior art wing flap.
FIG. 3 depicts a prior art aircraft.
FIG. 4 depicts a prior art aircraft.
FIG. 5 depicts a prior art aircraft.
FIG. 6 depicts a prior art wing flap.
FIG. 7 depicts a slotted wing flap of the inventive concept at different degrees of deflection.
FIG. 8 depicts an actuation mechanism and hinge utilized in conjunction with a slotted wing flap of the inventive concept.
FIG. 9 shows sectional lift coefficients of a single slot embodiment of a wing flap of the inventive concept in comparison with a conventional flap lacking a slot.
FIG. 10 shows flow visualizations from CFD simulations for different positions of a flap of the inventive concept.
FIG. 11 shows a flow visualization from a CFD simulation of a flap of the inventive concept in a position corresponding to a hover flight condition.

DETAILED DESCRIPTION

Figure 1:
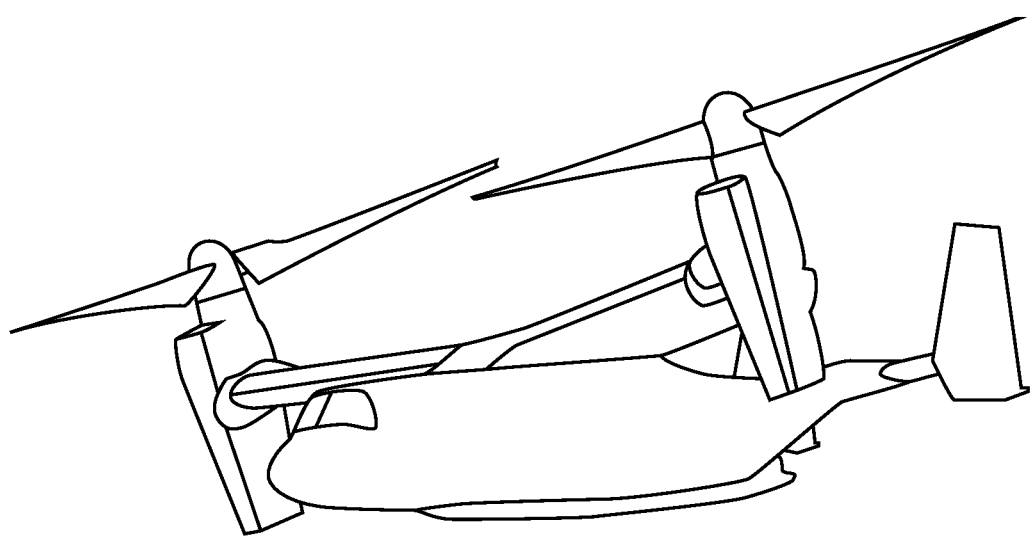
FIG. 1.
Figure 2:
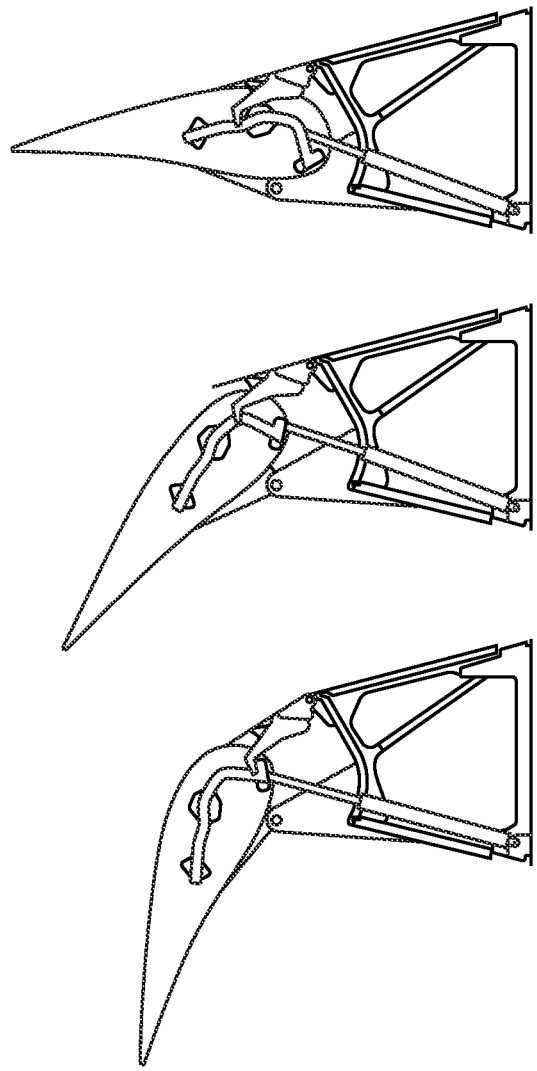
FIG. 2.
Figure 3:
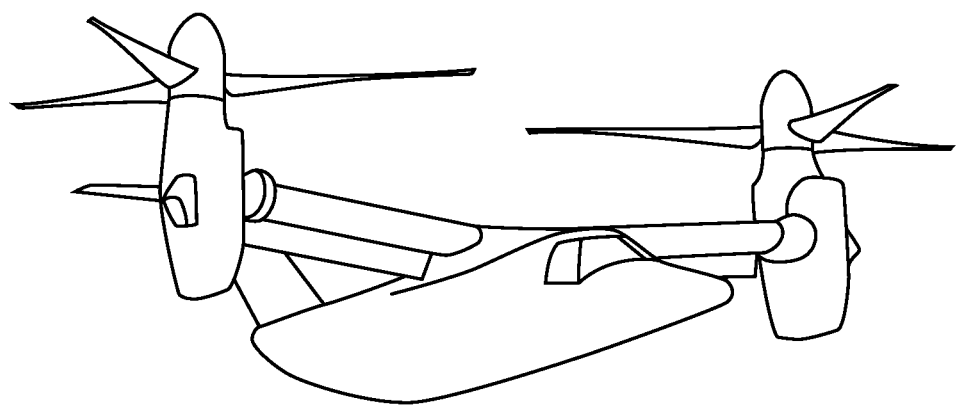
FIG. 3.
Figure 4:
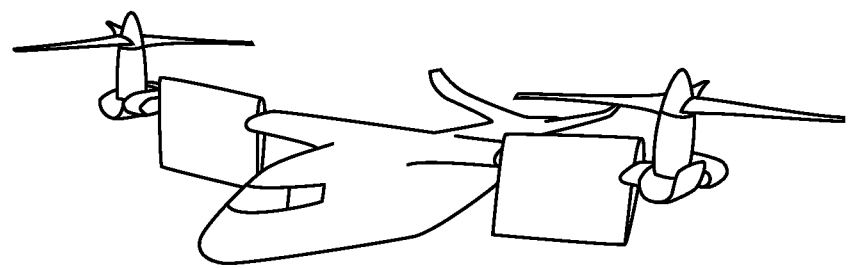
FIG. 4.
Figure 5:
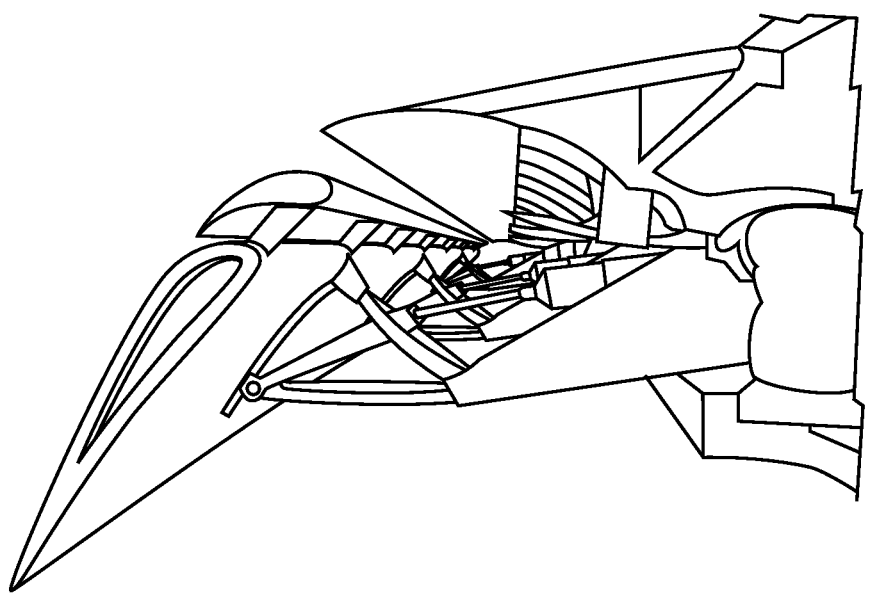
FIG. 5.
Figure 6:
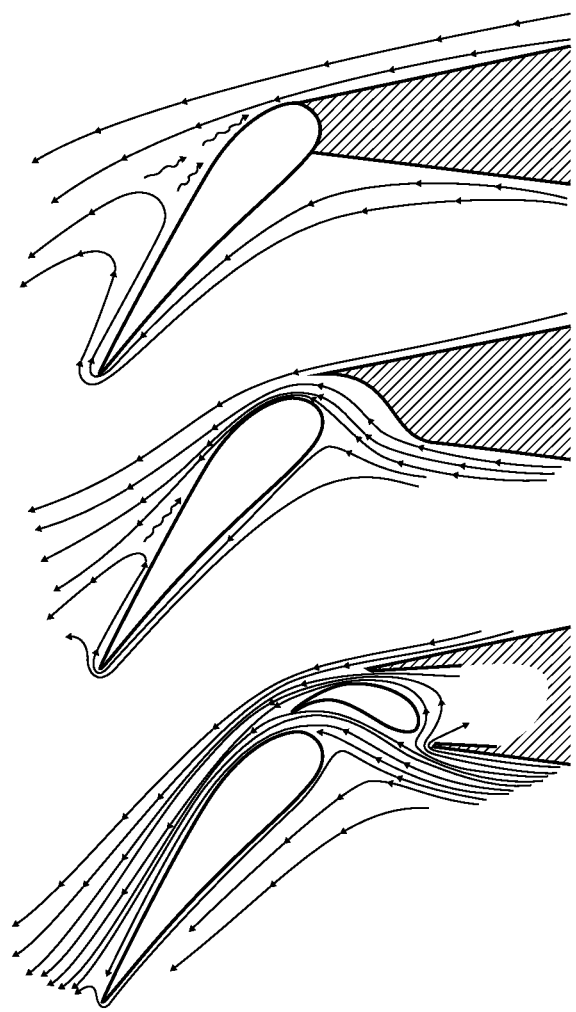
FIG. 6.

The inventive subject matter provides apparatus, systems and methods in which a flap system is deflected to achieve minimum drag in cruise, maximum coefficient of lift (CL) at low speed, and minimum download in hover. It does so by opening a gap or slot between an aircraft's wing body and an associated trailing flap during hover flight, while providing a continuous aerodynamic contour under other conditions.

In contrast with conventional tiltrotor flap designs, the gap between the trailing flap body and wing body is expanded rather than closed or reduced during hover flight and/or transition to hover flight. The invention is also distinct from conventional double slotted flap arrangements in both providing a more extensive deflection range and in the notable absence of a spoiler or complex hinge mechanism for modifying gap size.

In preferred embodiments, such a gap is interposed between the wing body and an intermediate body (which lies between the wing body and the trailing flap) when the aircraft wing is in a hover position. This gap is dimensioned (e.g. sufficiently large) to provide a break in an aerodynamic contour defined the wing body and the trailing flap when the aircraft wing is in a hover position, and thereby minimizing download. Conversely, for cruise flight (e.g. horizontal flight) the trailing flap body and intermediate body are retracted such that these elements form a single aerodynamic contour with the wing body, thereby minimizing drag.

Typically, the relative angle between the flap body and the intermediate body is adjusted or set to an angle ranging from 20° to 60°, 30° to 50°, or 35° to 45° for tom configure the aircraft for high lift flight. Conversely, the relative angle between the flap body and the intermediate body can be adjusted or set to an angle ranging from 70° to 110°, 72.5° to 100°. or 75° to 95° to configure the aircraft for hover flight.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

In some embodiments these features can be realized by providing an aircraft wing with a double-slotted flap with a hover position of 75-95 degrees. In one embodiment of the invention, a trailing flap body and intermediate body are displaced from a wing body during deflection, such that two slots are exposed.

Figure 7:
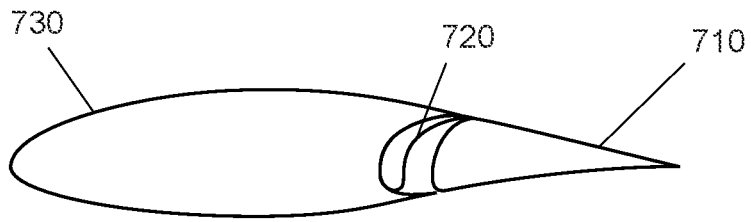
FIG. 7.
Figure 7:
Figure 7:
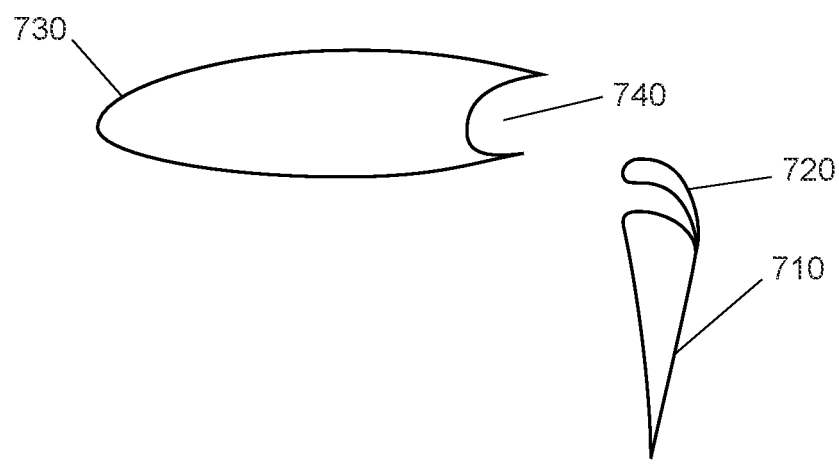

FIG. 7 shows an exemplary embodiment of the inventive concept, and depicts a wing structure with trailing flap or flap body (710), intermediate body (720), and wing body (730) in stowed (top), high lift (middle), and hover (bottom) configurations. The wing body includes a channel (740) that is exposed when intermediate body and trailing flap or flap body are rotated into high lift and/or hover positions. The intermediate and flap bodies can be pivoted about a rotatable connection (e.g. a hinge) displaced below the wing body. As shown, this pivoting opens a channel or slot between the wing body and the intermediate body and also opens a channel between the intermediate body and the trailing flap or flap body.

When retracted (e.g. in stowed or horizontal/cruising flight configuration), unlike conventional wing flaps or flaperons, the upper and lower trailing edges of the wing body effectively seal against the flap body on the upper and lower wing surfaces to bring the drag of the flapped wing very close (e.g. within 70%, 80%, 90%, 95%, or more) to that of a conventional single element wing that is not so equipped. The intermediate body which lies in the closed gap is not exposed to the freestream airflow when retracted into the stowed (e.g. cruising or horizontal flight) configuration, as it is positioned within a complementary channel of the wing body.

When deflected or rotated to an intermediate position (for example, a high lift position of about 40° is shown in FIG. 7), a slot between the wing body and the intermediate body and a slot between the intermediate body and the trailing flap/flap body is exposed to the freestream airflow moving over the wing structure. When fully deflected (for example, a hover flight position of about 90° as shown in FIG. 7), the intermediate body and the trailing flap/flap body are even further displaced from the wing body, opening the slot between the intermediate body and wing body even wider.

Figure 8:
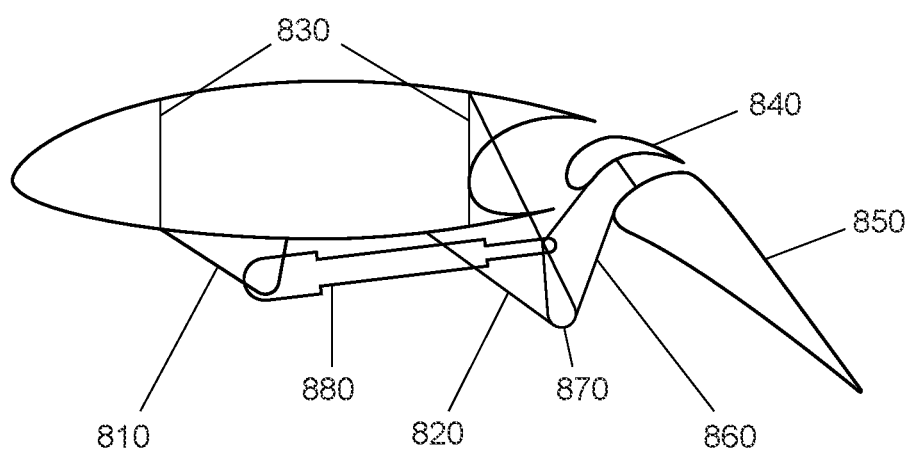
FIG. 8.

FIG. 8 shows an exemplary actuation mechanism and hinge system of the inventive concept. Fore and aft reaction fittings (810 and 820, respectively) are fixed to the wing structure (830) to react the loads from the hinged components. The flap body (840) and intermediate body (850) are rigidly attached to a flap support fitting (860) which rotates about a flap hinge (870). The angular position is controlled by an actuator (880), such as a linear actuator) rotatably coupled (e.g. via a hinge) to the a point on the fore reaction fitting and a point on the flap support fitting. The actuator can control the angular position of the flap support fitting by extending and contracting linearly, thereby changing the configuration of the flap mechanism.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 9:
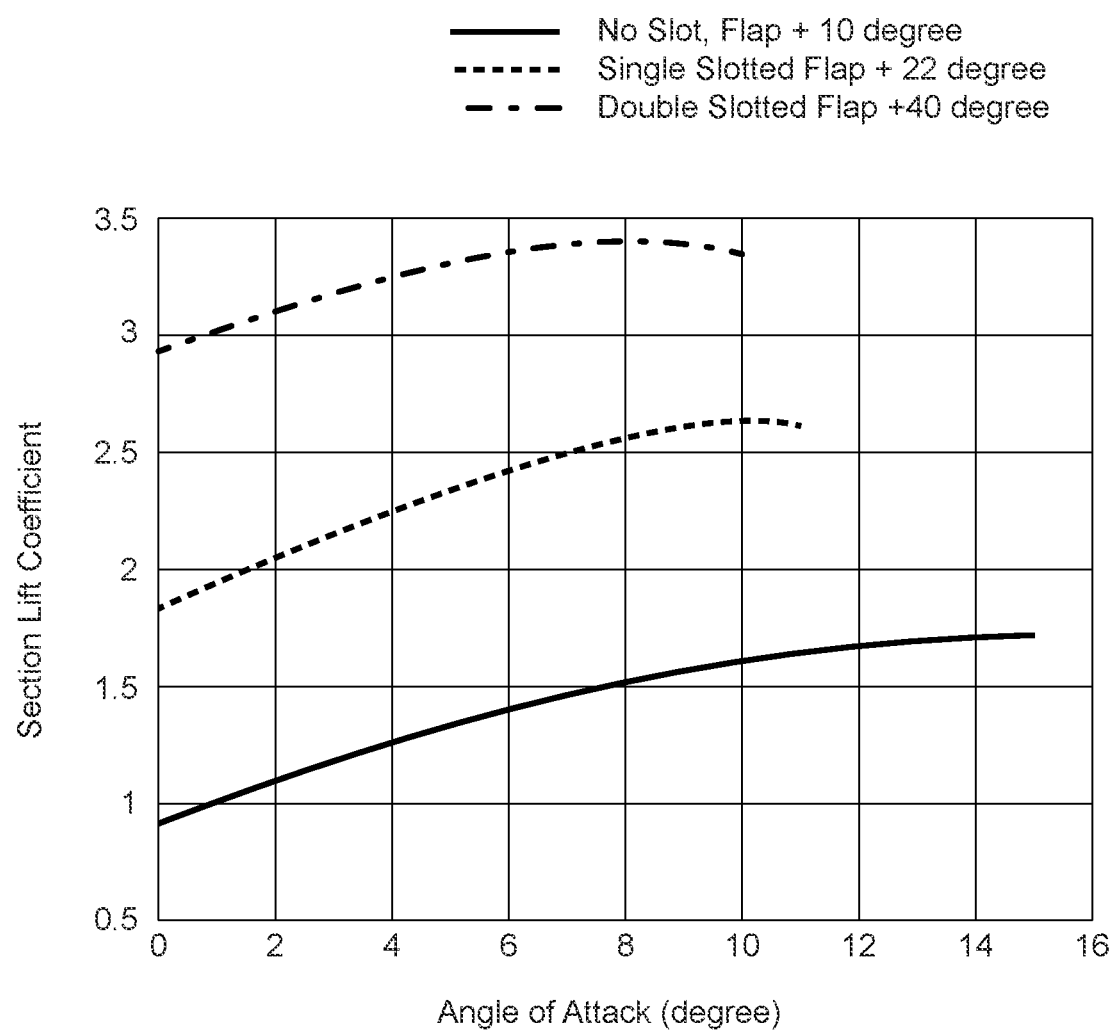
FIG. 9.

FIG. 9 depicts the resulting sectional lift coefficients of a single slot design of the inventive concept and of a conventional flap without a slot. These are results of computational fluid dynamics (CFD) simulations of the three configurations at Reynolds number of $3 \times 10^6$ and a freestream Mach of 0.15. The lift coefficient is shown to increase by approximately 1 for each slot added given a fixed angle of attack. The maximum lift coefficient achievable at any angle of attack is increased by approximately 0.8 for each slot added. Flap mechanisms of the inventive concept can reduce the angle of attack for maximum lift coefficient by approximately 6°, which advantageously maintains a pitch attitude tolerable for passengers and/or cargo while also enabling visibility in steep descent angles.

Figure 10:
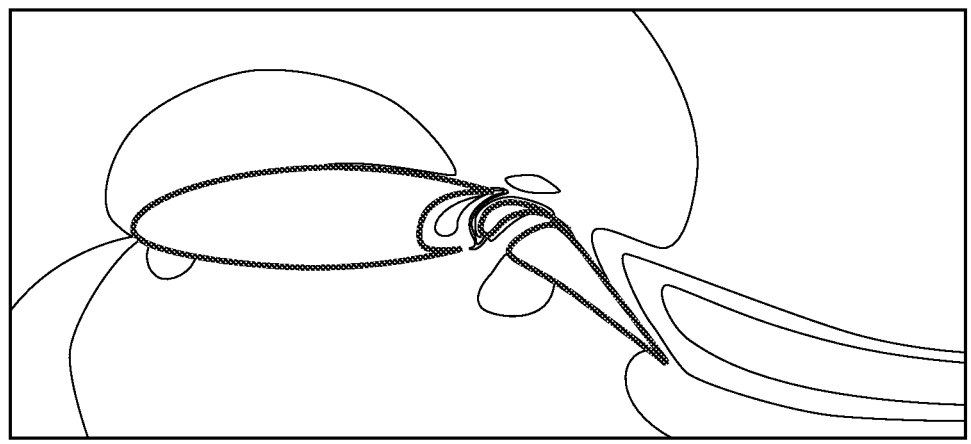
FIG. 10.

FIG. 10 shows typical results of a flow visualization from CFD simulations of a flap mechanism of the inventive concept in a 40° position (e.g. a high lift position) and an angle of attack of 4°. Extensive regions of accelerated flow with corresponding low pressure exist both over the wing body and intermediate body. The lack of reverse flow trailing the flap body indicates that flow remains attached and the airfoil is not stalled.

Figure 11:
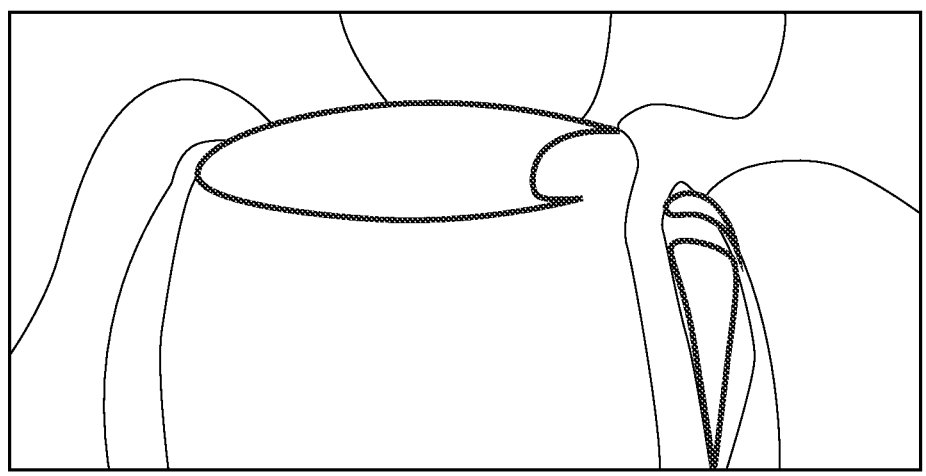
FIG. 11.

FIG. 11 shows typical results of a flow visualization from CFD simulations of a flap mechanism of the inventive concept in a 90 degree position and angle of attack of approximately −90 degrees, corresponding to hover flight condition. As shown, airflow stagnates on the upper surface of the wing body and must accelerate forward or aft. Flow going aft turns beyond the upper trailing edge of the wing body and passes over the deflected intermediate body and flap body. The small frontal area so presented reduces the downward force contribution compared to undeflected intermediate and flap bodies. The predicted download is equal or better than that achieved by a conventional flap of equivalent size. The intermediate and flap bodies' position can be optimized such that the downward trailing wake is contracted to further reduce download.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of operating a vertical takeoff and landing (VTOL) aircraft,
wherein the VTOL aircraft comprises a wing, wherein the wing comprises 1) a wing body having an upper and a lower surface and comprising a leading edge and a trailing edge, wherein the trailing edge comprises a channel, 2) a trailing flap, and 3) an intermediate body interposed between the wing body and the trailing flap;
the method comprising:
maintaining the intermediate body within the channel when the trailing flap is in a stowed position;
extending the intermediate body and trailing flap away from the channel and at least 75° downward relative to the wing body, so that the aircraft wing is in a hover position when the aircraft is in a hover flight condition; and
forming a vertical gap between the wing body and the intermediate body, wherein the entire intermediate body is below the entire wing body; and wherein the vertical gap is sufficiently large to provide a break in the aerodynamic contour represented by the wing body and the trailing flap when the aircraft wing is in the hover position.

2. The method of claim 1, wherein the wing body and the trailing flap describe an angle of 35°-45° when the aircraft wing is in a high lift position.

3. The method of claim 1, wherein the wing body, the intermediate body, and the trailing flap provide a continuous aerodynamic contour when the aircraft wing is in zero deflection.

4. The method of claim 1, wherein the aircraft wing and the trailing flap describe an angle of 75°-95° when the aircraft wing is in the hover position.

5. The method of claim 1, wherein the intermediate body juxtaposes the trailing flap when the aircraft wing is in the hover position.

6. The method of claim 1, wherein an angular relationship between the intermediate body and the trailing wing is maintained between the stowed position and the hover position.

7. The method of claim 1, wherein the intermediate body retains a fixed position with respect to the trailing flap in both the stowed and hover positions.

8. The method of claim 1, wherein a top of the intermediate body is below an edge of the wing body when the aircraft wing is in the hover position.

9. The method of claim 1, wherein the vertical gap is at least as wide as a length of the intermediate body.

\* \* \* \* \*